A. R. GIBSON.
EDUCATIONAL DEVICE.
APPLICATION FILED FEB. 7, 1921.

1,383,097. Patented June 28, 1921.

Inventor:
Ada R. Gibson,
by Spear, Middleton, Donaldson & Hall.
Attys.

UNITED STATES PATENT OFFICE.

ADA R. GIBSON, OF RIVERDALE, MARYLAND.

EDUCATIONAL DEVICE.

1,383,097. Specification of Letters Patent. Patented June 28, 1921.

Application filed February 7, 1921. Serial No. 443,186.

*To all whom it may concern:*

Be it known that I, ADA R. GIBSON, a citizen of the United States, and a resident of Riverdale, in the county of Prince Georges and State of Maryland, have invented certain new and useful Improvements in Educational Devices, of which the following is a specification.

This invention relates to educational appliances of the type which may be used by children who are beginning to read.

The object of this invention is to provide a device which may be given to a child as "seat work" which will be interesting and yet at the same time of educational value.

Another object is to provide a device which may be used by the same child in a progressive manner, that is, by a simple rearrangement of the parts it may be made more difficult, when the child has mastered sufficiently the simpler working thereof.

Another object is to provide a device of the character described which may be used by the child with the minimum amount of instruction from the teacher.

These and other objects are obtained by providing a sheet having thereon an illustration and a verse or other explanatory matter. On the reverse side of the illustration are a plurality of lines of varying intensity intersecting each other in haphazard fashion. The child is first to form a picture puzzle by cutting on the heaviest lines. After this mutilated picture has been sucessfully put together, further cuts are made along the lighter lines, thus making the reforming of the illustration more difficult.

Likewise the verse or other explanatory reading matter is divided into sentences at first, later subdivided into phrases, then into words, as the pupil gains knowledge. At first the sentences are cut out and when the pupil can place the numerous sentences together to form the rhyme or the like, they are subdivided into phrases and then further into words.

An envelop or folder is provided to contain the original sheet for convenience to both teacher and child. Upon this envelop is a facsimile of the sheet, only without lines. It may be desirable to provide the picture and verse at the bottom of the sheet, which may be removed by the child or teacher and pasted upon a blank envelop. Suitable places may be provided on the envelop for the name of the pupil for sanitary reasons. This holder serves as a means of identification of the subject matter of the sheet and of the owner; also as a guide to the pupil in rearranging the parts inclosed.

The invention further consists in the novel arrangement and combination of parts more fully hereinafter described, reference being made to the accompanying drawings, in which.

Figure 1:
Figure 1 is a view of a sheet made according to this invention.

Referring now by reference characters to the drawing, a sheet of paper, cardboard or the like is shown at 1, divided into two parts in the present instance. The upper portion contains a picture 2, which has below it a verse rhyme or other similar reading matter 3, which is descriptive of or otherwise related to the picture.

As shown, the reading matter is provided with heavy lines 4 which separate the several lines of the verse. Lighter lines 5 further subdivide the lines into phrases and again even lighter lines into single words.

Figure 2:
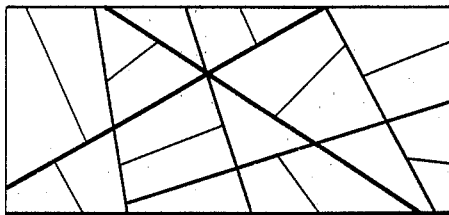
Fig. 2 is a reverse view of Fig. 1.
Figure 3:
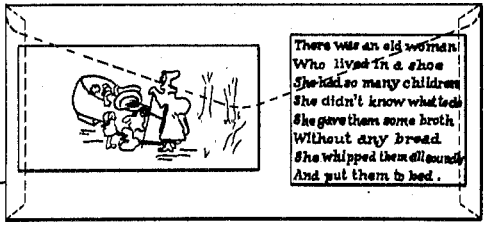
Fig. 3 is a view of a container for the sheet.

Referring to Fig. 2, it will be seen that similar heavy and light lines are used as a guide to cut the picture into puzzle sections, large pieces at first, small pieces as the child gains skill.

It will also be apparent that each word of the verse has the same word written on its reverse side in another form, shown as script, for a purpose more fully hereinafter described.

The envelop or container for the sheet is shown at 6 having the picture and printed matter thereon similar to the sheet.

The child first memorizes the verse. Then having been given the envelop containing the puzzle with a pair of scissors he cuts the verse and the picture along the heavy lines. This the child accomplishes with the minimum amount of instruction. Having the card and the scissors, it is very natural that he will begin to cut the card along the most prominent lines. This having been done, he re-forms the picture and places together the lines of the verse until proficient.

The card is then subdivided into smaller portions by cutting along the light lines and the operation repeated. At all times the pupil may refer to the envelop to guide in reforming both picture and reading matter.

Having now mastered the reading matter as shown in printed form, the words are turned over, which then disclose the verse in script. In this way, the pupil may be made to recognize letters and words both as written by the teacher and as printed in a book.

The lesson having been learned, a demonstration may be made to the teacher, who grades the child and puts a mark on the envelop designating the degree of proficiency which the pupil has attained.

Figure 4:
Fig. 4 is a view of a modification.

Fig. 4 shows a modification in which the sheets are made into book form which are readily separable for distribution. In this way keeping the different lessons together is greatly facilitated for the teacher.

It will be seen that this device is one which will afford amusement to the child and at the same time be instructive. As it is only necessary to give a very small amount of instruction to the child, this system will also be of great value to the teacher. The character of instruction necessary is so simple that it may readily be given by an older scholar.

Obviously, other modifications of this system of progressive seat work instruction may be practised other than that shown, therefore I do not wish to be limited to the exact construction shown and described, but which is to be taken as illustrative of a preferred form of my device.

What I claim is:

1. An educational device comprising a chart having thereon a picture and a plurality of lines of differing intensities, said lines adapted to guide the pupil in making a simple picture puzzle by severing the chart along the heavy lines and then a difficult one by severing said chart along the lighter lines.

2. The device of claim 1 provided with correlated reading matter associated with the pictures which is provided with like lines of differing intensities.

In testimony whereof, I affix my signature.

ADA R. GIBSON.